(12) United States Patent
Nakamoto et al.

(10) Patent No.: US 6,628,475 B2
(45) Date of Patent: Sep. 30, 2003

(54) DISK DRIVE APPARATUS, HARD DISK DRIVE, AND ENCLOSURE FOR HARD DISK DRIVE

(75) Inventors: Tatsuo Nakamoto, Sagamihara (JP); Shingo Tsuda, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 10/001,496

(22) Filed: Oct. 26, 2001

(65) Prior Publication Data
US 2002/0071203 A1 Jun. 13, 2002

(30) Foreign Application Priority Data
Oct. 27, 2000 (JP) ........................................ 2000-329414

(51) Int. Cl.[7] .............................................. G11B 17/02
(52) U.S. Cl. .................................................... 360/97.02
(58) Field of Search ............................ 360/97.03, 97.02

(56) References Cited

U.S. PATENT DOCUMENTS

| | | | |
|---|---|---|---|
| 5,898,545 A | * | 4/1999 | Schirle .................... 360/97.02 |
| 6,054,833 A | * | 4/2000 | Takeuchi .................. 360/97.02 |
| 6,369,977 B1 | * | 4/2002 | Imai et al. ................ 360/97.02 |
| 6,369,978 B1 | * | 4/2002 | Shimizu et al. .......... 360/97.03 |

FOREIGN PATENT DOCUMENTS

| | | |
|---|---|---|
| JP | 07-320478 | 12/1995 |
| JP | 2000-156068 | 6/2000 |
| JP | 2002-008347 | 1/2002 |
| JP | 2002-124062 | 4/2002 |

\* cited by examiner

*Primary Examiner*—Robert S. Tupper
(74) *Attorney, Agent, or Firm*—Robert B. Martin; Bracewell & Patterson, L.L.P.

(57) ABSTRACT

To restrain a flutter of a magnetic disk in a high-speed hard disk drive, a ramp 40 is provided so as to be separated with a predetermined space from a side wall 12a of a base 12. Between the side wall 12a and the ramp 40 is formed a bypass channel 42. An air flow is supplied toward a magnetic disk 22 through the bypass channel 42. By using such a configuration, a flutter of the magnetic disk 22 is reduced.

9 Claims, 8 Drawing Sheets

[Figure 1]
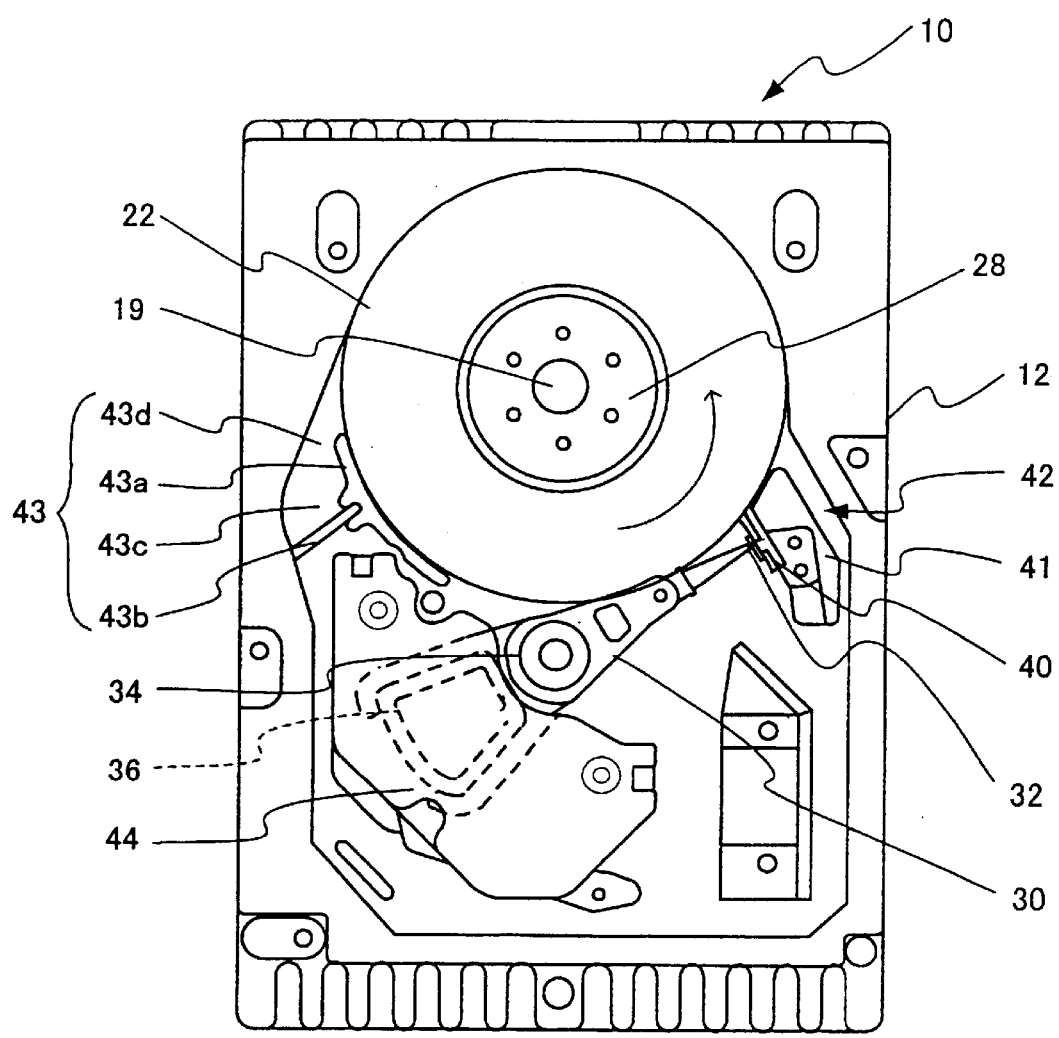

[Figure 2]
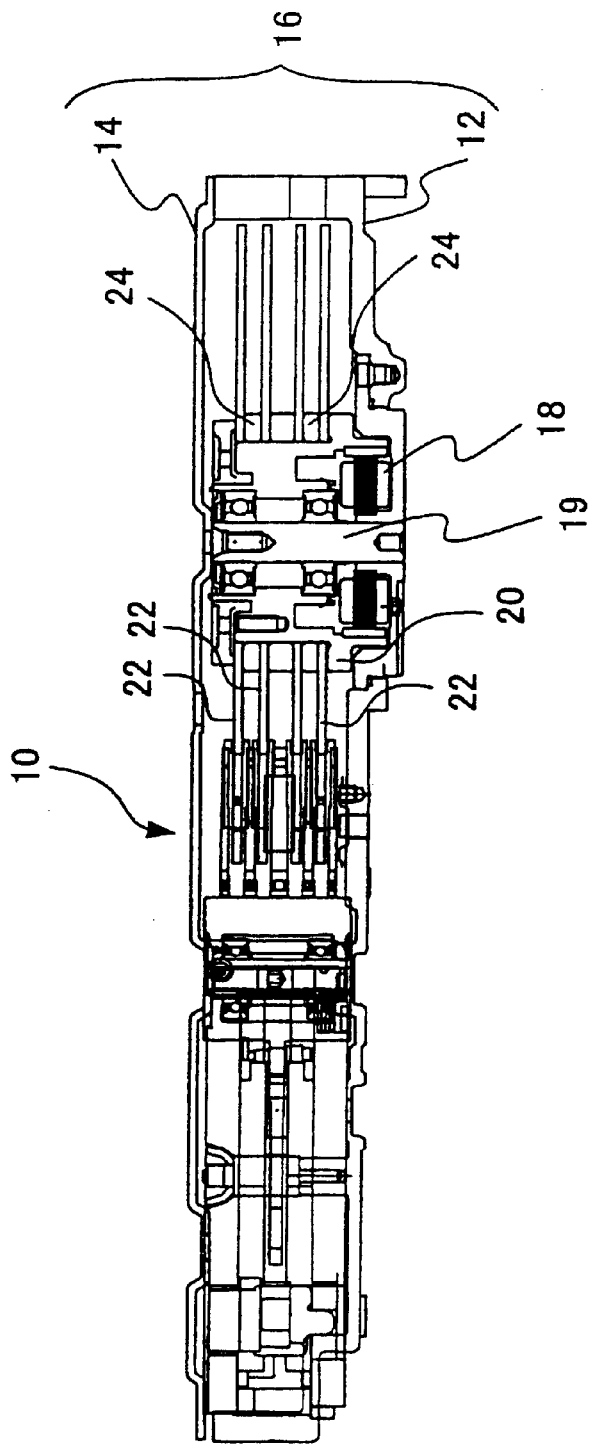

[Figure 3]
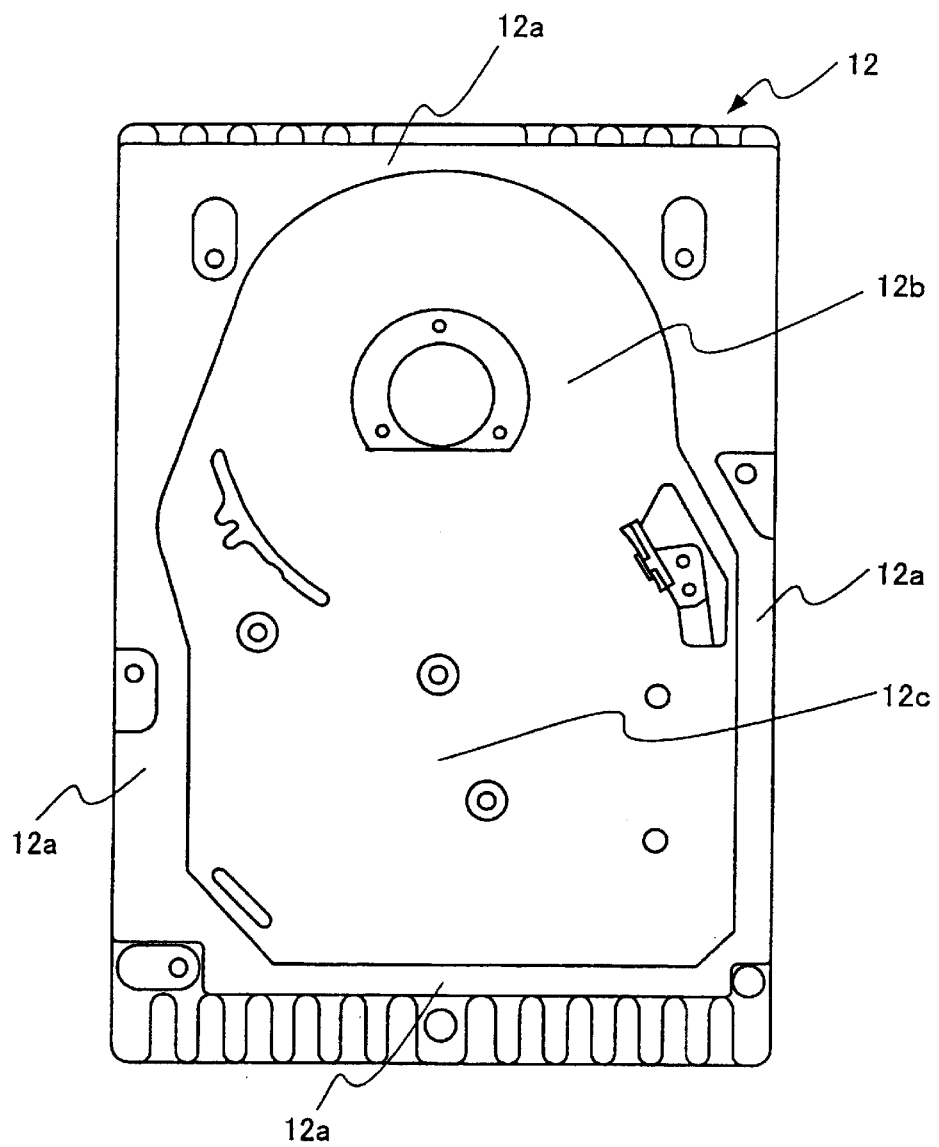

[Figure 4]
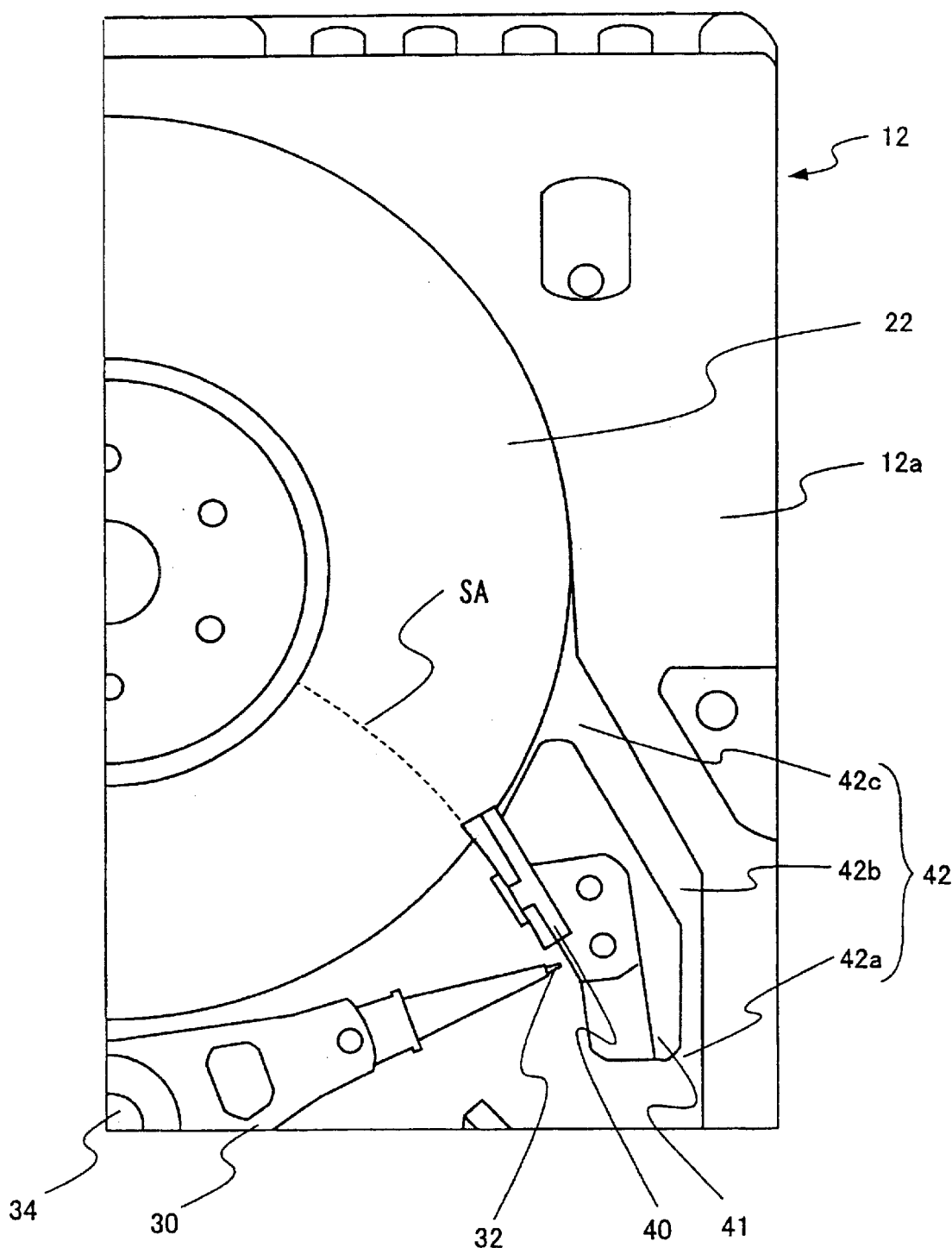

[Figure 5]
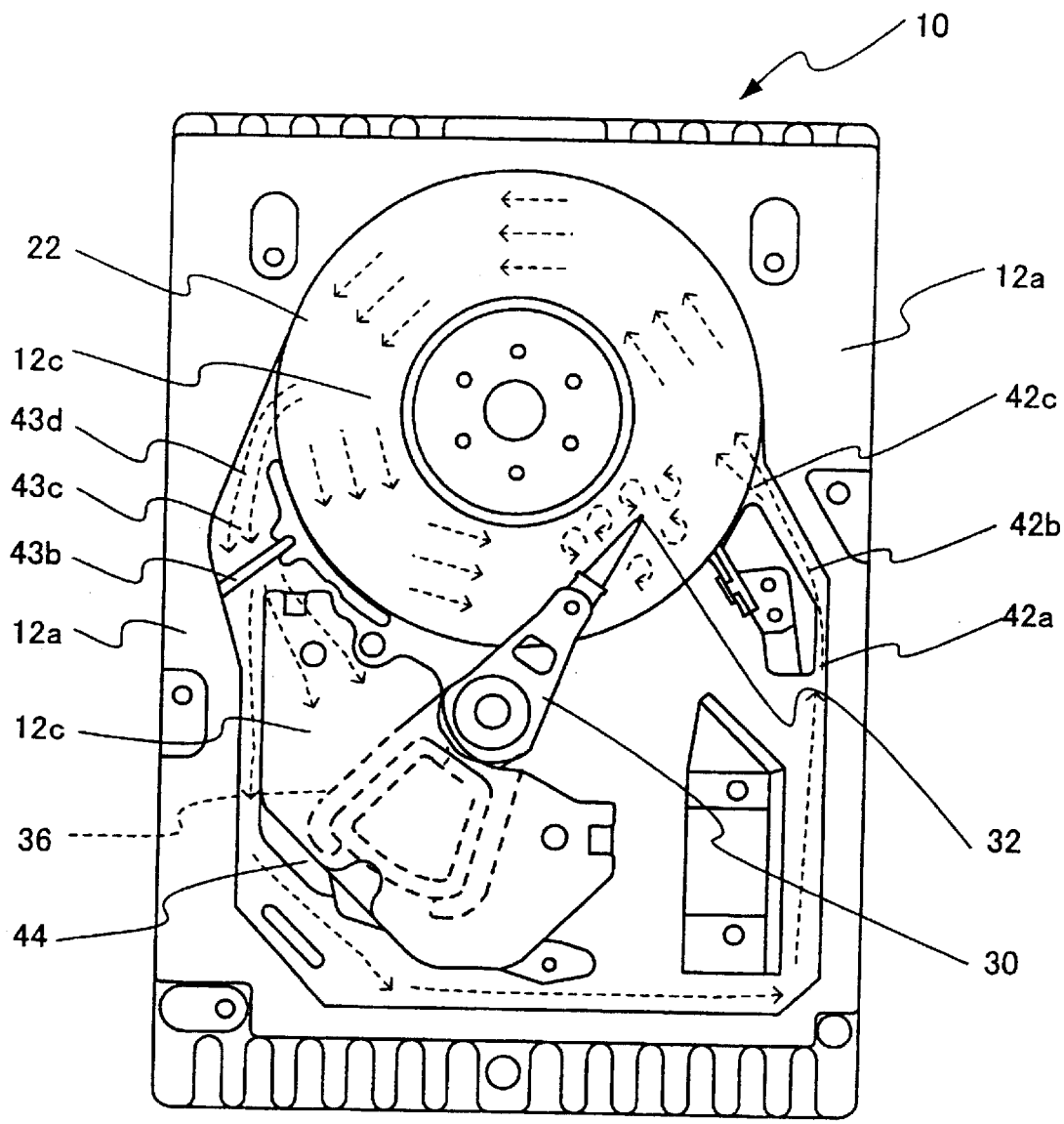

[Figure 6]
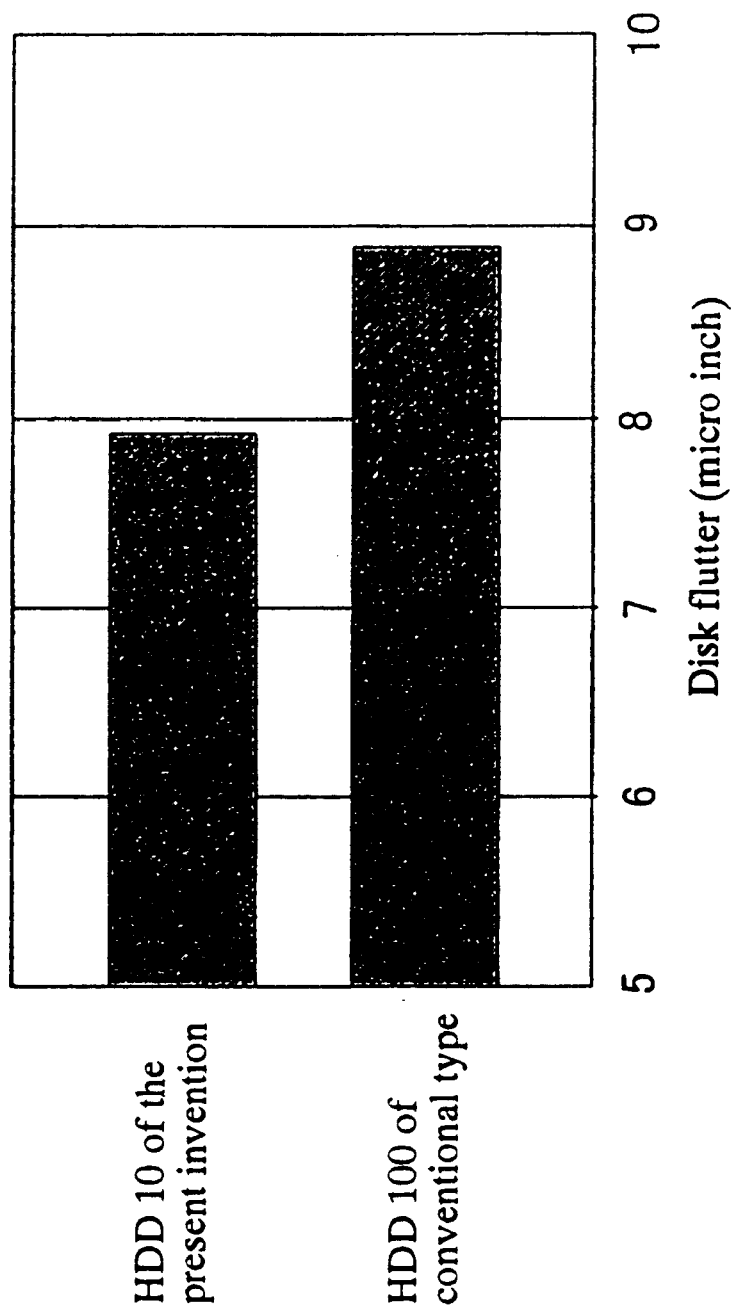

[Figure 7]
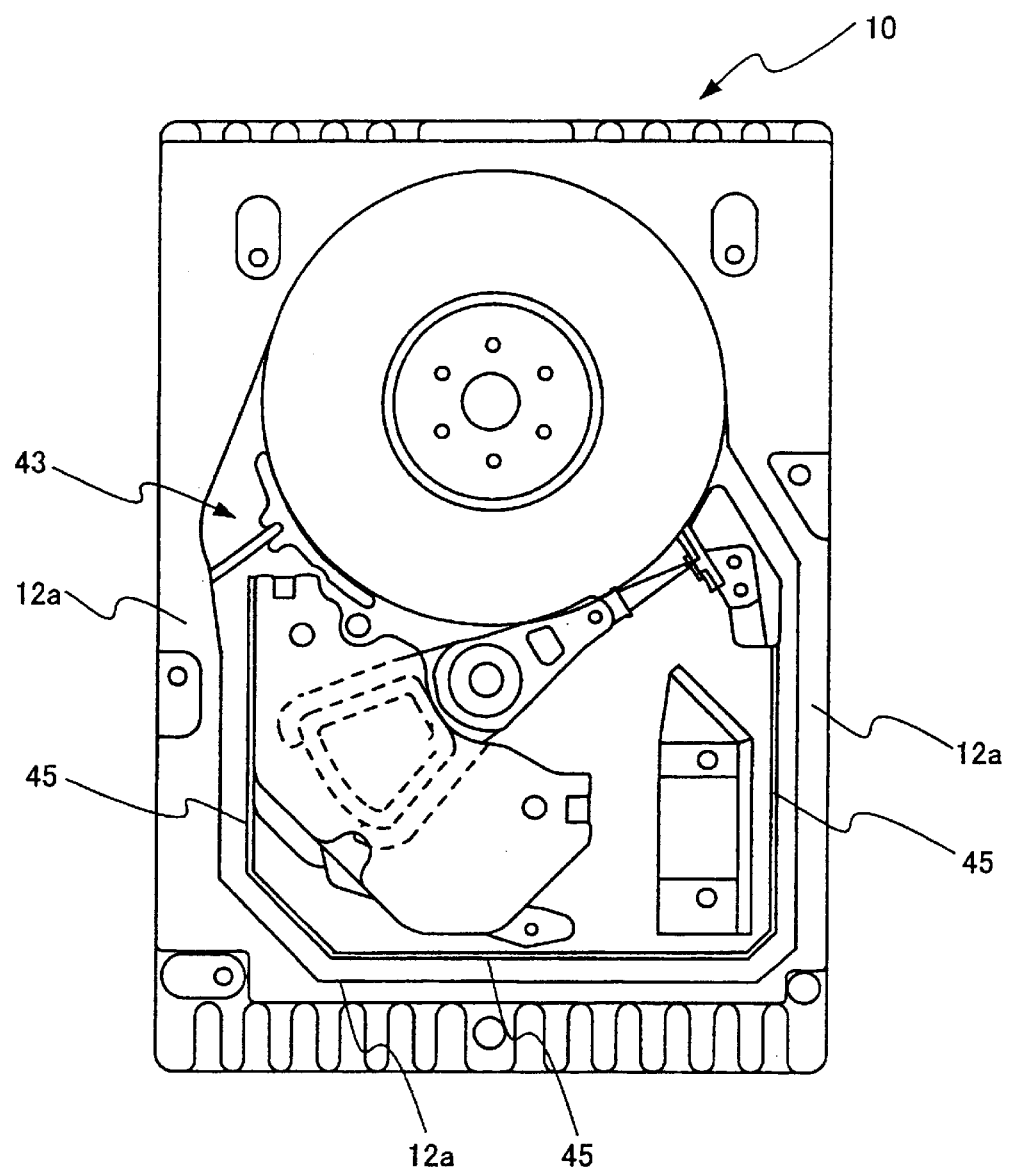

[Figure 8]
(PRIOR ART)
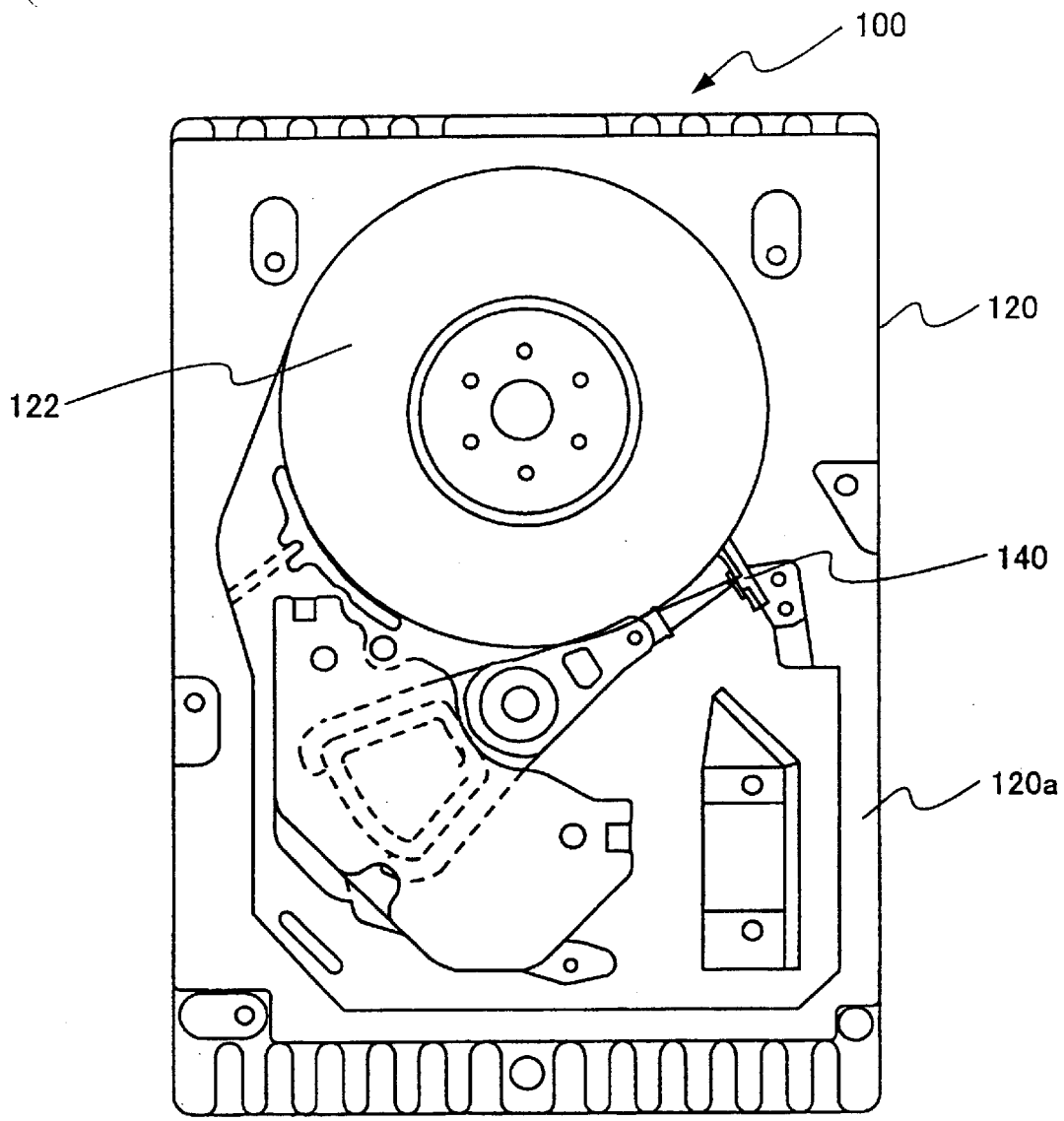

DISK DRIVE APPARATUS, HARD DISK DRIVE, AND ENCLOSURE FOR HARD DISK DRIVE

This application claims the priority benefit of Japanese patent application No. 2000-329414, filed on Oct. 27, 2000, and entitled "Disk Drive Apparatus, Hard Disk Drive, and Enclosure for Hard Disk Drive."

BACKGROUND OF THE INVENTION

1. Technical Field

The present invention relates in general to a disk drive apparatus represented by a hard disk drive.

2. Description of the Related Art

A hard disk drive (hereinafter abbreviated as an HDD) most popularly used as data storage means for a computer has a construction such that a single or a plurality of magnetic disks are disposed coaxially and are driven by a spindle motor. Data is read from and written on the magnetic disk with a magnetic head provided so as to be opposed to the magnetic disk. The magnetic head is driven by an actuator, generally by a voice coil motor (hereinafter abbreviated as a VCM). The magnetic disks, magnetic head, and actuator are contained in an enclosure called a disk enclosure. The disk enclosure is made up of a thin box-shaped base made of, for example, an aluminum alloy and a top cover for sealing an opening of the base.

One of the major technical problems with the HDD is to increase the speed of reading data stored on the magnetic disk and the speed of writing data on the magnetic disk. One means for solving this problem is to increase the rotational speed of the magnetic disk. However, the increase in rotational speed of the magnetic disk increases the velocity of an air flow generated by the rotation of the magnetic disk. As a result, a flutter of the magnetic disk increases. If a flutter of the magnetic disk (hereinafter referred to as a disk flutter) occurs, a relative positional relationship between the magnetic disk and the magnetic head changes, so that the increase in disk flutter has an adverse influence on the accuracy in reading and writing data. Specifically, it is assumed that when data is written, the data is written undesirably on a track that is different from the track on which the data is supposed to be written, or when data is read, the data is read undesirably from a track that is different from the track from which the data is supposed to be read. In particular, if the storage density is increased to increase the capacity of the magnetic disk, this tendency becomes great.

3. Problems to Be Solved by the Invention

Although the rotational speed of a 3.5-inch magnetic disk was 7200 rpm at first, a high rotational speed of 10,000 rpm has been adopted, and further a high-speed HDD rotating at a rotational speed exceeding 10,000 rpm has been developed. As the velocity of an air flow generated in the HDD increases, a flutter of the magnetic disk becomes remarkable. On the other hand, as the rotational speed of the magnetic disk increases, the velocity of the air flow generated in the HDD increases. Therefore, the increase in rotational speed of the HDD makes a problem of accuracy in reading and writing data caused by a flutter of the magnetic disk serious.

Accordingly, an object of the present invention is to provide a disk drive apparatus capable of restraining a flatter of a magnetic disk in a high-speed HDD.

SUMMARY OF THE INVENTION

The inventor presumed that the disk flutter is not affected simply by the rotational speed of magnetic disk only, but a turbulent flow generated by the interruption of an air flow taking place on a magnetic disk when the magnetic head is positioned over the magnetic disk also has an influence. Based on this presumption, the inventor took measures for making the air flow in the HDD more stable, specifically, provided a new air flow path in the HDD, by which a knowledge that the disk flutter could be reduced was obtained. The disk drive apparatus in accordance with the present invention has been invented based on this knowledge.

Therefore, the present invention provides a disk drive apparatus comprising: a disk-like medium rotationally driven around a rotating shaft, the disk-like medium being used to store data; a reading/writing head for storing data and playing back the data; an actuator for causing the reading/writing head to seek on the disk-like medium; an enclosure for containing the disk-like medium, the reading/writing head, and the actuator, the enclosure having a side wall standing at the periphery thereof; and a bypass channel for supplying part of an air flow generated in the enclosure by the rotational drive of the disk-like medium from an exterior of the enclosure in the radial direction of the disk-like medium toward the disk-like medium.

The disk drive apparatus in accordance with the present invention can reduce a disk flutter by supplying part of the air flow generated in the enclosure by the rotational drive of the disk-like medium to the disk-like medium through the bypass channel.

In the disk drive apparatus in accordance with the present invention, it is preferable that the bypass channel comprise an inflow port through which an air flow enters, a channel for guiding the air flow entering through the inflow port, and an outflow port through which the air flow introduced into the channel is discharged, and the outflow port be provided in the vicinity of the range of seek of the reading/writing head performed by the actuator. The disk flutter is produced by the rotational drive of the disk-like medium. When the reading/writing head is positioned over the disk-like medium, a turbulent flow is generated by the presence of the reading/writing head, so that the disk flutter is increased. Therefore, it is understood that by supplying an air flow in a straightened state from the bypass channel to the vicinity of the range in which the reading/writing head moves, that is, the seek range, an effect of reducing the turbulent flow is produced, and thereby the disk flutter can be reduced.

Also, in the disk drive apparatus in accordance with the present invention, the inflow port and the channel can be formed along the side wall. In other words, the side wall of the enclosure is utilized to form the bypass channel.

Further, in the disk drive apparatus in accordance with the present invention, the configuration can be such that the disk drive apparatus has a discharge port for discharging part of the air flow generated by the rotational drive of the disk-like medium to the outside in the radial direction of the disk-like medium, and part of the air flow discharged through the discharge port goes to the inflow port. The purpose of this is to effectively keep the air flow supplied from the bypass channel toward the disk-like medium. The hard disk drive is provided with a filter mechanism on the exterior of the drive, and this filter mechanism can form the discharge port.

Also, the present invention provides a disk drive apparatus comprising: a disk-like medium rotationally driven around a rotating shaft, the disk-like medium being used to store data; a reading/writing head for storing data and playing back the data; an actuator for causing the reading/writing head to seek on the disk-like medium; and an enclosure for containing the disk-like medium, the reading/ writing head, and the actuator, characterized in that the enclosure has a side wall standing at the periphery thereof, a disk container room for containing the disk-like medium, and a wall standing along the side wall so as to be separated with a predetermined space from the side wall, one end of the wall facing the disk container room.

In this disk drive apparatus, the enclosure has a side wall standing at the periphery thereof, a disk container room for containing the disk-like medium, and a wall standing along the side wall so as to be separated with a predetermined space from the side wall, one end of the wall facing the disk container room, and the space between the side wall and the wall one end of which faces the disk container room forms the aforementioned bypass channel. Therefore, by supplying part of the air flow generated by the rotational drive of the disk-like medium from the space toward the disk-like medium, the disk flutter can be reduced.

The present invention can be applied to a hard disk drive serving as a disk drive apparatus. Specifically, the hard disk drive in accordance with the present invention comprises: a disk assembly having a magnetic disk for storing data and a spindle motor for driving the magnetic disk rotationally; a magnetic head for storing data and playing back the data on and from the magnetic disk; an actuator for causing the magnetic head to seek on the magnetic disk; a base having a disk container room for containing the disk assembly and an actuator container room for containing the actuator, the base having a side wall standing at the periphery thereof; and an air flow path having an inflow port opening to the actuator container room, an outflow port opening to the disk container room, and a channel connecting the inflow port to the outflow port.

The hard disk drive in accordance with the present invention has the air flow path having the inflow port opening to the actuator container room, the outflow port opening to the disk container room, and the channel connecting the inflow port to the outflow port. Therefore, part of the air flow generated in the actuator container room by the rotational drive of the magnetic disk can be supplied toward the magnetic disk through the air flow path. Therefore, the turbulent flow generated by the presence of the magnetic head over the magnetic disk is stabilized, and thereby the disk flutter is reduced.

Also, in the hard disk drive in accordance with the present invention, in order to sufficiently perform a function of stabilizing the air flow, it may be desirable that the outflow port be open to the downstream side along the direction of rotation of the magnetic disk with respect to the seek range of the magnetic head.

In this hard disk drive, the filter mechanism can be provided on the outside in the radial direction of the magnetic disk on the further downstream side of the outflow port. It is judged to be effective in stabilizing the air flow that a flow is produced such that as described above, the air flow discharged to the filter mechanism enters the air flow path, and is supplied toward the magnetic disk.

Still further, in the hard disk drive in accordance with the present invention, a flow path forming wall can be provided ranging from the filter mechanism to the air flow path so as to be separated with a predetermined space from the side wall. This is an effective means for causing the air flow discharged to the filter mechanism to enter the air flow path surely.

Also, the present invention provides a hard disk drive comprising: a magnetic disk for storing data; a magnetic head for storing data and playing back the data on and from the magnetic disk; an actuator for supporting the magnetic head and for loading or unloading the magnetic head onto or from the magnetic disk; a base having a container room for containing the magnetic disk, the magnetic head, and the actuator and a side wall standing at the periphery of the container room; and a ramp disposed in the container room of the base so as to be separated with a predetermined space from the side wall to support the actuator at the unload time of the magnetic head.

In the above-described hard disk drive in accordance with the present invention, the ramp is disposed so as to be separated with a predetermined space from the side wall of the base, and this predetermined space forms the aforementioned bypass channel. Therefore, part of the air flow generated in the container room by the rotational drive of the magnetic disk can be supplied toward the magnetic disk through the space between the ramp and the side wall. As a result, the turbulent flow generated by the presence of the magnetic head over the magnetic disk is stabilized, and thereby the disk flutter is reduced.

In the hard disk drive in accordance with the present invention, the base can be provided with a space of a predetermined width along the side wall in a portion where the actuator is contained. The purpose of this is to keep a flow path of the air flow.

Also, in the hard disk drive in accordance with the present invention, the size of the magnetic disk is preferably smaller than the size of a magnetic disk corresponding to the form factor of the base. This is because an adequate room is necessary to provide the space between the ramp and the side wall of the base. The form factor means a factor relating to a form such as a shape and a size. At present, three form factors of 5.25 inches, 3.5 inches, and 2.5 inches are available. The standard widths excluding a tolerance are 5.75 inches (146.05 mm), 4.0 inches (101.6 mm), and 2.75 inches (68.95 mm). The form factor of 3.5 inches does not mean that the diameter of the magnetic disk mounted in the HDD is 3.5 inches. Generally, a hard disk drive with a form factor of 3.5 inches has been mounted with a magnetic disk of 95 mm (3.74 inches). However, if the 95-mm magnetic disk corresponding to the form factor of 3.5 inches is mounted, it is difficult to provide a space between the ramp and the side wall of the base. Although the space can be provided, the side wall must be made thin in this case, resulting in a decrease in stiffness of the base.

Thereupon, for the high-speed hard disk drive, it is preferable that the size of the magnetic disk be smaller than the size of a magnetic disk corresponding to the form factor of the base. The reason for this is that the decrease in diameter of the magnetic disk can restrain an increase in power consumption of the spindle motor for rotating the magnetic disk. Therefore, the present invention is suitable for a high-speed hard disk drive in which a disk flutter is liable to occur.

The above-described bypass channel or air flow path can be formed in an enclosure forming a hard disk drive. Therefore, the present invention provides such an enclosure. Specifically, the present invention provides an enclosure for a hard disk drive, comprising: a side wall standing at the periphery of the enclosure; a disk container room for containing a magnetic disk for storing data; and a wall standing along the side wall so as to be separated with a predetermined space from the side wall, one end of the wall facing the disk container room.

Also, the present invention provides an enclosure for a hard disk drive, used for a hard disk drive of a load/unload type, comprising: a container room for containing a magnetic disk for storing data magnetically and an actuator for driving a magnetic head, the magnetic head being used to store data and play back the data on and from the magnetic disk; a side wall surrounding the container room; and a ramp disposed in the container room so as to be separated with a predetermined space from the side wall to hold the magnetic head at the unload time of the magnetic head.

BRIEF DESCRIPTION OF THE DRAWINGS

FIG. 1 is a plan view of an HDD 10 in accordance with an embodiment of the present invention;

FIG. 2 is a side view of an HDD 10 in accordance with an embodiment of the present invention;

FIG. 3 is a plan view of a base 12 of an HDD 10 in accordance with an embodiment of the present invention;

FIG. 4 is a partially enlarged view of an HDD 10 in accordance with an embodiment of the present invention;

FIG. 5 is a view showing an air flow generated at the time of rotation of a magnetic disk 22 of an HDD 10 in accordance with an embodiment of the present invention;

FIG. 6 is a chart showing measurement results for a disk flutter for an HDD 10 in accordance with an embodiment of the present invention and a conventional HDD 100;

FIG. 7 is a plan view of a modification of an HDD 10 in accordance with an embodiment of the present invention; and FIG. 8 is a plan view of a conventional HDD 100.

DETAILED DESCRIPTION OF THE PREFERRED EMBODIMENT

An embodiment of the present invention will now be described with reference to the accompanying drawings. FIG. 1 is a plan view of a hard disk drive (HDD) 10 in accordance with this embodiment, and FIG. 2 is a side sectional view of the HDD 10 shown in FIG. 1. The HDD 10 is an HDD of a head load/unload type. Also, the HDD 10 has a form factor of 3.5 inches, and also has a rated rotational speed of 15,000 rpm to increase a data reading/writing speed.

As shown in FIG. 1, the HDD 10 forms a disk enclosure 16 by sealing an open upper part of a shallowly bottomed box-shaped aluminum alloy base 12 by means of a top cover 14, not shown. The top cover 14 is fixed to the base 12 with screws via a rectangular frame-shaped seal member (not shown), by which the interior of the disk enclosure 16 is made airtight.

In the disk enclosure 16 is provided a spindle motor 18 of an in-hub construction in the center of the base 12. On the top face of a hub 20 of the spindle motor 18, magnetic disks 22 each consisting of a glass substrate or an aluminum substrate are fixed by means of a top clamp 28, and the magnetic disks 22 are rotationally driven counterclockwise by the spindle motor 18. The magnetic disk 22 has an outside diameter of 70 mm. The top end of a spindle 19 of the spindle motor 18 is fixed to the top cover 14 with a bolt, not shown. Therefore, the spindle 19 has a both-end support construction.

The magnetic disk 22 is a disk-like storage medium for storing data. Data is stored on a magnetic thin film (not shown) formed on the glass substrate or the aluminum substrate. As shown in FIG. 2, a spacer 24 is interposed between the adjacent magnetic disks 22. This spacer 24 is a member for regulating a distance between the magnetic disks 22.

Also, an actuator 30 is provided in the disk enclosure 16. At one end of the actuator 30 is disposed a magnetic head 32, and an intermediate portion of the actuator 30 is supported on the base 12 via a pivot 34. Therefore, the actuator 30 is pivotally moved around the pivot 34. At the other end of the actuator 30 is provided a coil 36 for VCM (voice coil motor), and the actuator 30 is pivotally moved by the coil 36 for VCM and a VCM 44.

On the outside surface (bottom surface) of the base 12 is installed a card, not shown, serving as a circuit substrate. This card has a rectangular shape of a size such as to cover the outside surface of the base 12. Electric power, signals, etc. for driving the motor are transferred between the card and the spindle motor 18, and power to the coil 36 for VCM and electric power and signals for reading by the magnetic head 32 and for other purposes are transferred between the card and the actuator 30. The transfer of power and signals between the card and the actuator 30 is accomplished via a flexible cable.

The HDD 10 of this embodiment is an HDD of what is called a load/unload type. For the HDD 10 of a load/unload type, at the inoperative time (unload time), the magnetic head 32 is unloaded to a withdrawal position without being brought into contact with the surface of the magnetic disk 22 by holding the actuator 30 on a ramp 40. At the operative time (load time), the magnetic head 32 seeks on the magnetic disk 22 by the drive of the actuator 30.

FIG. 3 is a plan view of the base 12. As shown in FIG. 3, a side wall 12a stands at the periphery of the base 12, and an area surrounded by the side wall 12a is broadly divided into two areas: a disk container room 12b for containing a disk assembly formed of the magnetic disks 22 and the spindle motor 18 and an actuator container room 12c for containing the actuator 30. Referring now to FIG. 1, in the actuator container room 12c are disposed the coil 36 for VCM (voice coil motor) and the VCM 44 in addition to the actuator 30, and these elements are disposed so as to be separated with a predetermined space from the side wall 12a of the base 12. In other words, the actuator container room 12c contains elements including the actuator 30 with a predetermined space provided from the side wall 12a.

FIG. 4 is an enlarged view of the vicinity of the ramp 40. The ramp 40 is installed to a ramp mounting wall 41, one end of which faces the magnetic disk container room 12b of the base 12, with a screw or the like. The ramp mounting wall 41 is provided so as to be separated with a predetermined space from the side wall 12a standing at the periphery of the base 12. For the HDD 10 of this embodiment, therefore, the ramp 40 is provided so as to be separated with a predetermined space from the side wall 12a standing at the periphery of the base 12. This space forms a bypass channel 42. The bypass channel 42 includes an inflow port 42a through which an air flow generated by the rotation of the magnetic disk 22 enters, a channel 42b for guiding the air flow having entered through the inflow port 42a, and an outflow port 42c through which the air flow having been guided in the channel 42b is discharged. The outflow port 42c is open to the magnetic disk 22, so that the air flow having been guided in the channel 42b is discharged and supplied from the outflow port 42c toward the magnetic disk 22. Also, the outflow port 42c is located in the disk container room 12b of the base 12, and is open in the vicinity of a seek range SA (an arc with the pivot 34 being the center, indicated by a broken line in FIG. 4) in which the magnetic head 32 seeks by using the actuator 30, more specifically, it is open to the downstream side of the seek range SA along the direction of rotation (counterclockwise) of the magnetic disk 22 with respect to the seek range SA. The inflow port 42a is open to the actuator container room 12c, and is formed together with the channel 42b along the side wall 12a of the base 12. To form the bypass channel 42, the side wall 12a of the base 12 is utilized.

As shown in FIG. 1, the HDD 10 of this embodiment is provided with a filter mechanism 43 for collecting dust in the disk enclosure 16. Specifically, the filter mechanism 43 is disposed along the direction of rotation (counterclockwise) of the magnetic disk 22 on the further downstream side of the bypass channel 42. In the HDD 10 of this embodiment, the filter mechanism 43 is disposed symmetrically with the bypass channel 42 with respect to the rotation center of the magnetic disk 22. The filter mechanism 43 has a partitioning wall 43a standing at a predetermined distance from the side wall 12a of the base 12 and a filter 43b disposed between the side wall 12a and the partitioning wall 43a. Between the partitioning wall 43a and the side wall 12a is formed a collection room 43c, and an introduction port 43d is formed at one end of the collection room 43c.

Next, an air flow generated in the disk enclosure 16 when the magnetic disk 22 of the HDD 10 is rotated will be described with reference to FIG. 5. As described above, the magnetic disk 22 rotates counterclockwise. With this rotation, a counterclockwise air flow is generated over the magnetic disk 22, that is, in the disk container room 12b as indicated by the arrows of broken lines. When the magnetic head 32 is loaded and is located at any position over the magnetic disk 22, the magnetic head 32 and the actuator 30 make the air flow generated on the magnetic disk 22 turbulent. That is to say, it is understood that when the magnetic head 32 is loaded, an eddy-like turbulent flow is generated in the vicinity of the seek range of the magnetic head 32.

On the other hand, part of the air flow generated over the magnetic disk 22 is introduced into the collection room 43c of the filter mechanism 43 through the introduction port 43d. Specifically, part of the air flow generated by the rotational drive of the magnetic disk 22 is discharged to the outside in the radial direction of the magnetic disk 22 by the presence of the filter mechanism 43. The part of the air flow, after having passed through the filter 43b, is discharged into the actuator container room 12c.

The air flow having passed through the filter 43b enters the actuator container room 12c as indicated by the arrows of broken lines, by which an air flow is generated in the actuator container room 12c as well. In the actuator container room 12c, the actuator 30, the coil 36 for VCM, and the VCM 44 are disposed so as to be separated with a predetermined space from the side wall 12a of the base 12. Therefore, the air flow entering the actuator container room 12c goes in the space along the side wall 12a, as indicated by the arrows of broken lines, in preference to the central potion of the actuator container room 12c in which the actuator 30, the coil 36 for VCM, and the VCM 44 are present. The air flow going preferentially in the space along the side wall 12a enters the bypass channel 42 through the inflow port 42a, and is supplied toward the magnetic disk 22 via the channel 42b and the outflow port 42c.

As described above, according to the HDD 10 of this embodiment, part of the air flow generated by the rotational drive of the magnetic disk 22 is supplied toward the magnetic disk 22 from the outside in the radial direction of the magnetic disk 22 through the filter mechanism 43, the actuator container room 12c, and the bypass channel 42.

A disk flutter was measured by using the HDD 10 of this embodiment and an HDD 100 shown in FIG. 8. The HDD 100 is a hard disk drive having the same specifications as those of the HDD 10 except that a ramp 140 is installed directly to a side wall 120a of a base 120 so that the bypass channel 42 of the HDD 10 is not provided. Also, the rated rotational speeds of magnetic disks 22 and 122 were set at 15,000 rpm.

The measurement results are shown in FIG. 6. It was verified that the disk flutter of the HDD 10 decreased by 1 m inch ($25.4'10^{-6}$ mm) as compared with the HDD 100. The reason for the decrease in the disk flutter of the HDD 10 of this embodiment is not definite, but it is presumed to be as described below.

The reason for this is presumably that the bypass channel 42 performs a function of stabilizing the air flow generated in the HDD 10. Specifically, as shown in FIG. 5, when the magnetic head 32 lies over the magnetic disk 22, a turbulent flow is generated on the magnetic disk 22, and therefore this turbulent flow is a major cause for the occurrence of disk flutter. However, it is understood that by supplying an air flow in a straightened state to the vicinity of the seek range SA through the bypass channel 42, the turbulent flow is stabilized, so that the disk flutter is decreased. In particular, for the HDD 10 of this embodiment, it is considered that a flow path for air flow is formed along the side wall 12a front the filter mechanism 43 that is located at a position symmetrical with the bypass channel 42, so that the stabilization of air flow seems to be achieved through the whole of the HDD 10. In order to increase this function, it may be effective that a flow path forming wall 45 is provided ranging from the filter mechanism 43, around the actuator 30, the voice coil motor 44, and other interior components (not numbered) of the HDD 10, to the inflow port 42a of the bypass channel 42 so as to be separated with a predetermined space from the side wall 12a as shown in FIG. 7. In this way, flow path forming wall 45 defines an unobstructed channel through which air may flow unimpeded after the filter 43 away from the disk 22 and the disk container room 12b, around the enclosure 12 between the wall 45 and side wall 12a, past the ramp 40, and then back to the disk 22 and the disk container room 12b.

While the HDD 10 of this embodiment has a form factor of 3.5 inches, the magnetic disk 22 has a diameter of 70 mm. That is to say, the magnetic disk 22 is smaller than the size of a magnetic disk corresponding to the form factor. This is because the HDD 10 uses a high rotational speed of 15,000 rpm. Since the magnetic disk 22 of the HDD 10 is smaller than the size of a magnetic disk corresponding to the form factor, even if the bypass channel 42 is provided, the side wall 12a around the magnetic disk 22 can be made thick. Also, it can be said that the actuator 30, the coil 36 for VCM, and the VCM 44 can be disposed in the actuator container room 12c so as to be separated with a predetermined space from the side wall 12a of the base 12 because the magnetic disk 22 of the HDD 10 is smaller than the size of a magnetic disk corresponding to the form factor.

In the above description, the present invention has been explained by taking a hard disk drive as an example. However, the application of the present invention is not limited to a hard disk drive. The present invention can be applied widely to a disk drive apparatus provided with a disk-like storage medium in which a disk flutter is produced by the rotational drive of the disk-like medium. Also, although the HDD 10 is a hard disk drive of a load/unload type, the present invention can be applied to a hard disk drive of a CSS (Contact Start and Stop) type.

What is claimed is:

1. A disk drive apparatus, comprising:

a disk-like medium rotationally driven around a rotating shaft, the disk-like medium being used to store data;

a reading/writing head which stores data and plays back the data;

an actuator which causes the reading/writing head to seek on the disk-like medium;

an enclosure which contains the disk-like medium, the reading/writing head, and the actuator, the enclosure having a side wall standing at the periphery thereof;

a ramp disposed in the enclosure to support the actuator during unloading of the magnetic head, the ramp being spaced apart from the side wall; and a bypass channel between the ramp and the side wall which supplies part of an air flow generated in the enclosure by the rotational drive of the disk-like medium in a radial direction of the disk-like medium between the actuator and the side wall, and back toward the disk-like medium, such that the air flow flows unimpeded around the side wall from the actuator to the ramp.

2. The disk drive apparatus according to claim 1, wherein the bypass channel comprises an inflow port through which the air flow enters, a channel which guides the air flow entering through the inflow port, and an outflow port through which the air flow introduced into the channel is discharged, and the outflow port is provided in a seek range of the reading/writing head performed by the actuator.

3. The disk drive apparatus according to claim 2, wherein the inflow port and the channel are formed along the side wall, and further comprising an internal air filter located at a position that is approximately symmetrical with the bypass channel.

4. The disk drive apparatus according to claim 3, wherein the disk drive apparatus has a discharge port which discharges part of the air flow generated by the rotational drive of the disk-like medium in the radial direction of the disk-like medium, and part of the air flow discharge through the discharge port goes to the inflow port.

5. A hard disk drive, comprising:

a disk assembly having a magnetic disk which stores data and a spindle motor which drives the magnetic disk rotationally;

a magnetic head which stores data and plays back the data on and from the magnetic disk;

an actuator which causes the magnetic head to seek an the magnetic disk;

a base having a disk container room which contains the disk assembly and an actuator container room which contains the actuator, interior components, and a ramp for the actuator, the base having a side wall at the periphery thereof that is spaced apart from the actuator, the interior components, and the ramp;

an air flow path having an inflow port opening to the actuator container room, an outflow port opening to the disk container room, and a channel connecting the inflow port to the outflow port;

a filter mechanism mounted inside the enclosure in a radial direction of the magnetic disk; and a flow path forming wall extending around an interior of the enclosure from the filter mechanism, around the actuator, the interior components, and the ramp, and spaced apart from the side wall such that the flow path in unobstructed.

6. The hard disk drive according to claim 5, wherein part of an air flow generated in the actuator container room by a rotational drive of the magnetic disk is supplied toward the magnetic disk through the air flow path.

7. The hard disk drive according to claim 5, wherein the outflow port is open to the downstream side along a direction of rotation of the magnetic disk with respect to a seek range of the magnetic head.

8. An enclosure for a hard disk drive, comprising:

a side wall at a periphery of the enclosure;

a disk container room which contains a magnetic disk that stores data;

a ramp in the enclosure adjacent tote disk container room and spaced apart from the side wall;

a wall standing along the side wall so as to be separated from the side wall, the wall extending from the disk container room, along the side wall, and then to the ramp, such that an unobstructed air flow channel is defined between the wall and the side wall from the disk container room to the ramp.

9. An enclosure for a hard disk drive, used for a hard disk drive of a load/unload type, comprising:

a container room which contains a magnetic disk that stores data magnetically and an actuator that drives a magnetic head to define interior components, the magnetic head being used to store data and play back the data on and from the magnetic disk;

a side wall surrounding the container room;

a ramp disposed in the container room so as to be separated from the side wall to hold the magnetic head during unloading of the magnetic head; and a filter mounted adjacent to dip container room and extending to the side wall; and a wall, spaced apart from the side wall, extending all the way around the side wall from the filter, around the interior components, to the ramp.

* * * * *

UNITED STATES PATENT AND TRADEMARK OFFICE
CERTIFICATE OF CORRECTION

PATENT NO.    : 6,628,475 B2
DATED         : September 30, 2003
INVENTOR(S)   : Nakamoto et al.

It is certified that error appears in the above-identified patent and that said Letters Patent is hereby corrected as shown below:

<u>Column 10,</u>
Line 46, please remove the word "dip" and insert the word -- disk --.

Signed and Sealed this

Sixteenth Day of December, 2003

JAMES E. ROGAN
*Director of the United States Patent and Trademark Office*